US007001512B1

(12) United States Patent
Newsome

(10) Patent No.: US 7,001,512 B1
(45) Date of Patent: Feb. 21, 2006

(54) CLOSED LOOP PROCESSING SYSTEM FOR WASTE AND CROPS

(76) Inventor: David Ralph Newsome, 367 Capps Bridge Rd., Princeton, NC (US) 27569

( * ) Notice: Subject to any disclaimer, the term of this patent is extended or adjusted under 35 U.S.C. 154(b) by 796 days.

(21) Appl. No.: 10/073,778

(22) Filed: Feb. 11, 2002

Related U.S. Application Data

(60) Provisional application No. 60/267,394, filed on Feb. 9, 2001.

(51) Int. Cl.
*C02F 1/02* (2006.01)
*C02F 9/10* (2006.01)

(52) U.S. Cl. ...................... 210/181; 210/188; 210/196; 210/259; 210/295; 210/400; 210/526; 210/770; 210/774; 34/378; 34/398; 34/424; 119/447

(58) Field of Classification Search ................ 210/768, 210/769, 770, 771, 774, 783, 800, 803, 170, 210/173, 175, 188, 523, 526
See application file for complete search history.

(56) References Cited

U.S. PATENT DOCUMENTS 2,993,686 A * 7/1961 Adolf .......................... 432/72
3,377,146 A * 4/1968 Von Stroh ................... 75/321
3,400,465 A * 9/1968 Von Stroh ................... 34/443
3,460,768 A * 8/1969 Wenger ....................... 241/17
3,547,359 A * 12/1970 Wenger ....................... 241/47
3,736,111 A * 5/1973 Gardener ...................... 48/111
3,736,120 A * 5/1973 Tempe ............................. 71/9
3,744,145 A * 7/1973 Maxwell et al. ............... 34/68
3,761,237 A * 9/1973 Jeffreys ........................... 71/9
3,765,612 A * 10/1973 Wenger ....................... 241/23
3,775,132 A * 11/1973 Richards, Jr. ............... 426/656
3,885,119 A * 5/1975 Sargeant ..................... 219/775
3,910,775 A * 10/1975 Jackman ...................... 44/589
3,928,640 A * 12/1975 Stahler ....................... 426/465
4,077,847 A * 3/1978 Choi et al. .................... 201/21
4,082,532 A * 4/1978 Imhof ............................. 71/8
4,119,741 A * 10/1978 Stahler ....................... 426/641
5,354,349 A * 10/1994 Inoue .............................. 71/9
5,545,560 A * 8/1996 Chang ..................... 435/290.2
5,558,686 A * 9/1996 Lavelle, IV .................. 44/606
5,817,241 A * 10/1998 Brayboy ..................... 210/800
5,885,461 A * 3/1999 Tetrault et al. ............. 210/652
5,890,454 A * 4/1999 Moore, Jr. .................. 119/447
6,039,874 A * 3/2000 Teran et al. ................ 210/605
6,190,566 B1 * 2/2001 Kolber ....................... 210/744
6,207,057 B1 * 3/2001 White ........................ 210/609
6,245,121 B1 * 6/2001 Lamy et al. ..................... 71/1
6,248,985 B1 * 6/2001 Tomasello .................. 219/679
6,375,844 B1 * 4/2002 Ehrlich ....................... 210/605

(Continued)

*Primary Examiner*—Robert James Popovics
(74) *Attorney, Agent, or Firm*—Mills Law Firm PLLC

(57) ABSTRACT

A process for treating waste products discharged in a waste water from an animal operation, such as a swine confinement facility includes a holding tank for receiving waste water from the flushing of the facility in which solids to accumulate at the bottom thereof; wherein as conveyor transfers solids from said bottom at a rate preventing agitation of the waste water, to a compactor for removing additional water content and to a product dryer for converting the solids into a dry product. The product dryer includes a water heating system with water lines connected in a closed loop to the holding tank. The heating system thermal treats the circulating waste water and waste solids to a temperature sufficient to reduce undesired constituents therein. The product dryer is vented to a separator for recovering ammonia contents in the waste material.

9 Claims, 11 Drawing Sheets

U.S. PATENT DOCUMENTS

| | | | | |
|---|---|---|---|---|
| 6,387,267 | B1 * | 5/2002 | Kantardjieff | 210/615 |
| 6,395,187 | B1 * | 5/2002 | Alanis | 210/758 |
| 6,630,072 | B1 * | 10/2003 | Hoffland | 210/620 |
| 6,692,642 | B1 * | 2/2004 | Josse et al. | 210/605 |
| 6,908,554 | B1 * | 6/2005 | Jackson | 210/601 |
| 2001/0013497 | A1 * | 8/2001 | Kolber | 210/747 |
| 2002/0020677 | A1 * | 2/2002 | Noll | 210/766 |
| 2002/0079266 | A1 * | 6/2002 | Ainsworth et al. | 210/603 |
| 2002/0084227 | A1 * | 7/2002 | Sower | 210/739 |
| 2002/0096124 | A1 * | 7/2002 | Cabal et al. | 119/479 |
| 2002/0113012 | A1 * | 8/2002 | Hoffland | 210/620 |
| 2003/0057160 | A1 * | 3/2003 | Williams et al. | 210/718 |
| 2004/0011734 | A1 * | 1/2004 | Cha et al. | 210/603 |
| 2004/0112847 | A1 * | 6/2004 | Pullman | 210/806 |
| 2004/0154988 | A1 * | 8/2004 | Sheets, Sr. | 210/718 |
| 2004/0159608 | A1 * | 8/2004 | Hoffland | 210/620 |

* cited by examiner

CLOSED LOOP PROCESSING SYSTEM FOR WASTE AND CROPS

RELATED APPLICATION

This application claims the benefit under 35 USC 121 of U.S. Provisional Application No. 60/267,394 filed on Feb. 9, 2001 in the name of David Ralph Newsome and entitled "Basic System For Separating And Sterilizing Animal Waste Including Human, For Incineration Of Combustible Material, For Drying, Curing And Roasting Of Crops And Steaming And Roasting Of Foods".

FIELD OF THE INVENTION

The present invention relates to equipment and systems for thermal processing of waste material, crops and foods.

BACKGROUND OF INVENTION

For hundreds of years and more, hogs were allowed to roam freely in the woods or were penned in fenced pastures. This use of open space allowed the random placement of swine fecal waste and urine to be spread over a rather large area. There was not, usually, a heavy enough build up of waste in one area to cause anything other than a short term, often minor problem. The last few decades, however, have witnessed a radical change in the method of producing swine for market. The modern swine farm utilizes long confinement houses containing several hundred hogs at one time.

In a typical facility, the animals are grown on slotted concrete floors called "slats". Therein, an upper floor is raised above a concrete subfloor that receives the waste from the animals through the slots in the upper floor. The lower floor accumulates the swine fecal and urinary waste until such time as the waste is flushed by wastewater from a flushing tank. The flushing cycle can vary from a few hours to as much as a week depending upon the type of flushing system.

Other swine facilities use a solid, sloped floor having a gutter along the outside wall. With such a system, the pigs have direct access to the gutter and the flush water. The flush water in both of the above facilities is pumped from the top of a waste holding lagoon. When the pigs confined in a gutter type facility hear the flush water being released, they will run into the gutter, often lie in it and proceed to drink the flush water and eat the fecal matter in it. So many pigs will stand or lie in the gutter that it interferes with the adequate cleaning of the gutter.

The houses are flushed by several hundred gallons of water released from the flush holding tanks supplied from the lagoon. The flushed waste water is recycled, without treatment, to the waste holding lagoon.

The flush holding tanks located at the end of the houses opposite the lagoon are refilled from the top area of the lagoon to be ready for the next flush cycle. The lagoon is a man-made pond for collecting and storing the waste from the confinement houses and from which, after partial settling of the solids, wastewater is obtained for the next flushing cycle. Resultantly, modern swine production and the attendant holding lagoons generate substantial odors and present dangers of ground, ground water, and stream pollution. Other adverse results include lowered property values for adjacent properties and ground water depletion.

To get rid of excess water from the lagoon, the producer must pump the wastewater onto fields that have enough area to absorb and retain the effluent. This is especially critical during periods of heavy rainfall, such as that associated with a tropical storm or hurricane. Accordingly, the farmer must purchase and maintain an expensive irrigation system, fence and maintain a pasture, buy or build a small herd of cattle, purchase hay rakes, balers, and mowers just to service the lagoon.

BRIEF SUMMARY OF THE INVENTION

The present invention provides a closed loop thermal processing system that eliminates, in swine production, the need for a holding lagoon. The waste water and solids resulting from the flushing system are transferred to a holding tank for settling of the solids. A porous belt conveyor system transfers the solids from the holding tank while allowing solids drainage during transfer. At the end of the conveyor system, the partially drained solids are fed through a compaction roller assembly for additional drainage. They are pulverized and fed into a collection hopper from which they move into a shaker bed dryer unit maintained at an elevated temperature. The shaker bed progressively transfers and mixes the solids to promote thermal drying of the solids at a temperature eliminating bacterial and pathogenic contents. The resulting dry product is suitable for animal food supplement and fertilizer applications. The heating system for the dryer uses wastewater from the holding tank and raises the temperature to a sterilizing level also sufficient to remove harmful constituents. The heated water is fed to a separator for extraction of ammonia constituents, drained from the separator, cooled, filtered and recycled to a flush storage holding tank. The flushing system is thus fed from a thermal processed reservoir, from which solids and harmful constituents have been removed, resulting in an elimination of the adverse consequence of the lagoon and substantially better water quality for the flushing value. In addition, the recovered dry product and ammonia provide economic return to the facility operator.

The present invention in various configurations and attachments available can be employed as a swine, cattle and poultry waste processor, a human waste incinerator/processor, and in hospitals and veterinary hospitals as an incinerating system for human and animal body parts and medical refuse that otherwise is generally destroyed by incineration. The system can be adapted to process bones and meat scraps in a meat packing plant and to process the shells and scraps in a seafood plant. Whole fish and animals can be processed. Crops such as flue cured tobacco can be taken from the curing barn and run directly through the system to humidify and soften the leaves so that they can be sheeted or baled for market. In addition, the system can be used as a stationary or mobile dryer for grain, corn, and oil seed, as well as a roaster for sweet corn and oysters and a steamer for seafood.

Moreover, the system can be used as a stationary processor by small municipalities and satellite subdivisions as a disposal for human waste. Mobile units can be employed by the military. Relief organizations can preposition systems near earthquake, tornado, hurricane or other disaster prone areas for servicing showers, latrines, laundry, and food preparation to alleviate the stress and danger of disease associated with natural disasters.

Accordingly, it is an object of the present invention to provide a closed loop thermal processing system for animal wastes that eliminates waste holding lagoons.

Another object of the invention is to provide a drying system for animal waste that yields recoverable economic materials.

A further object is to provide a waste processing system that thermally eliminates the solids content of animal waste and improves the water quality to enable recycling.

Yet another object is to provide an agricultural dryer that can be used for processing a plurality of waste products, crops, and foods.

DESCRIPTION OF THE DRAWINGS

The above and other features and advantages of the present invention will become apparent upon reading the following detailed description taken in conjunction with the accompanying drawings in which.

DESCRIPTION OF THE PREFERRED EMBODIMENTS

Figure 2:
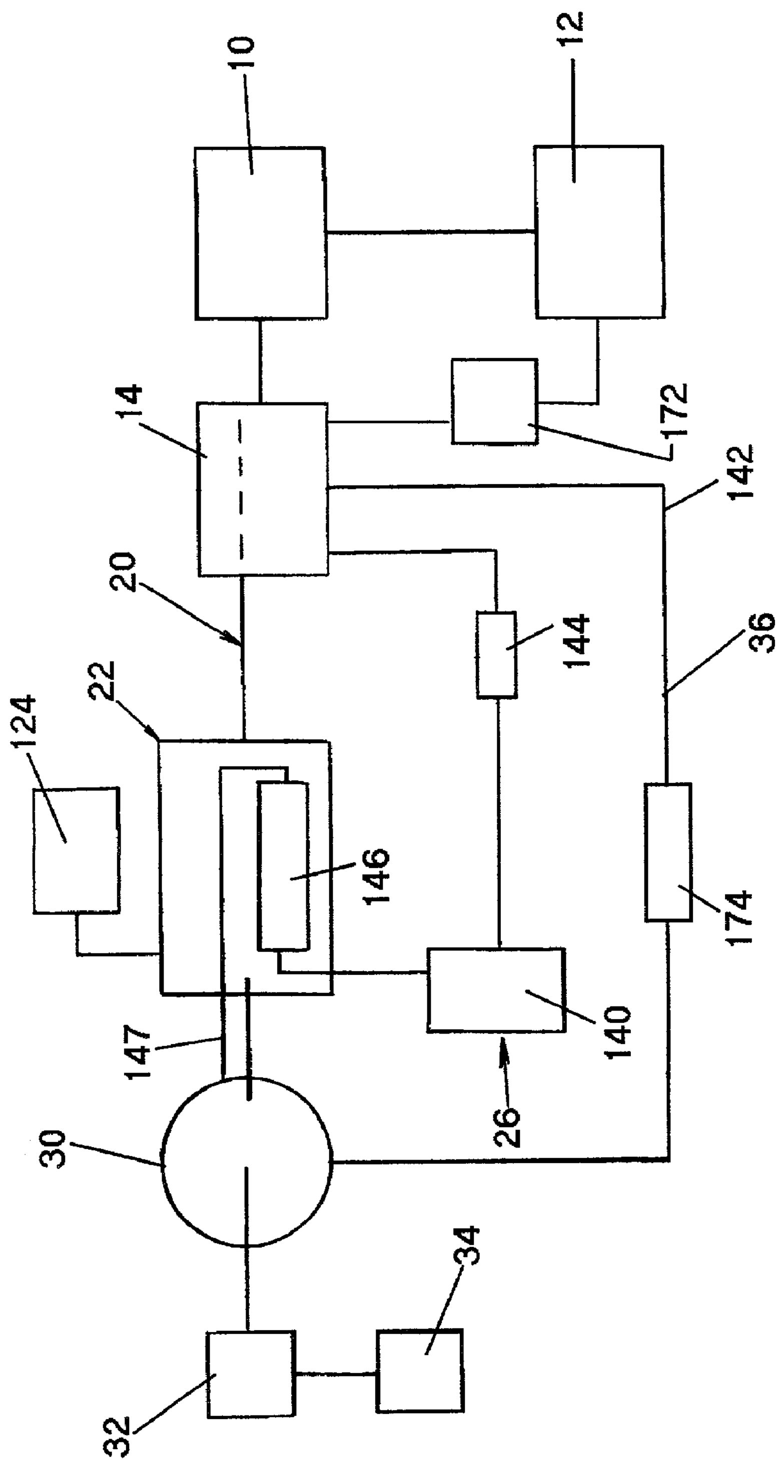
FIG. 2 is a schematic drawing of an open loop processing system in accordance with the invention.
Figure 3B:
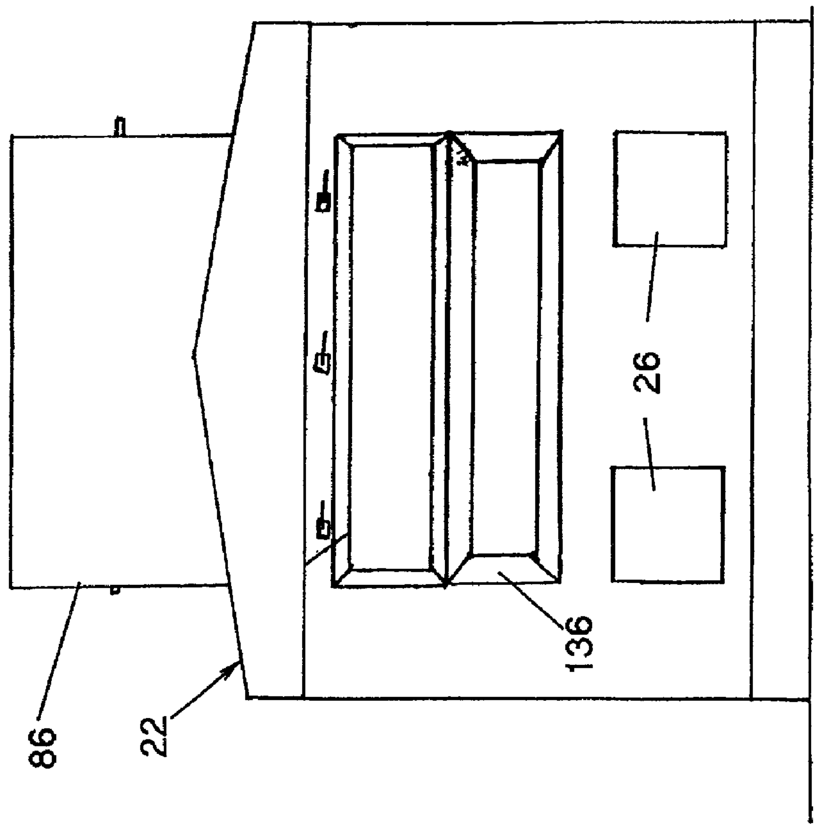
FIG. 3B is an end view of the dryer of the processing system with the product doors in the open position.
Figure 3A:
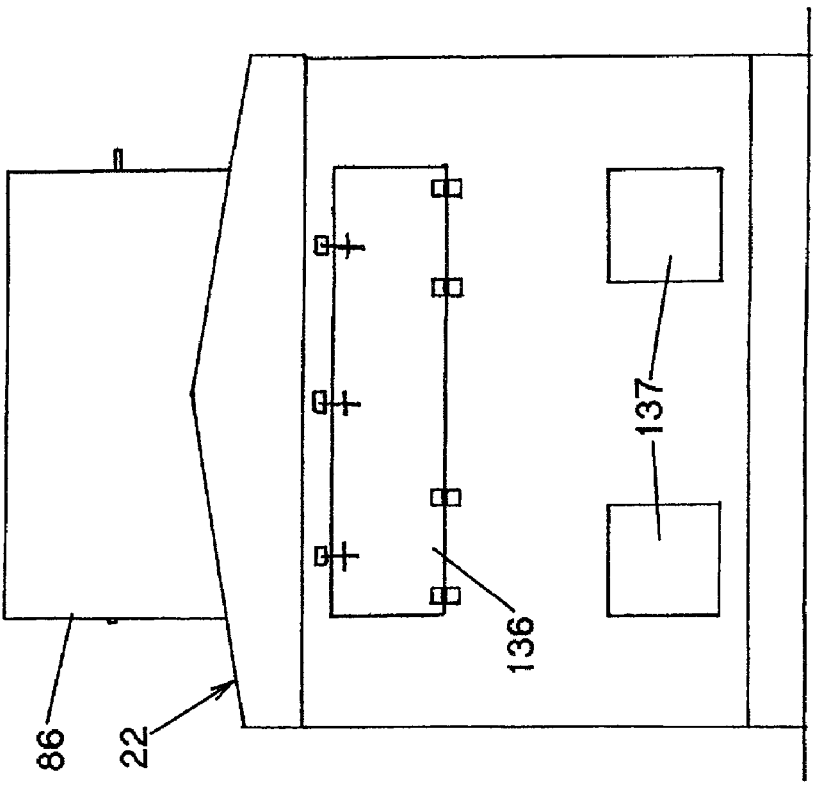
FIG. 3A is an end view of the dryer of the processing system with the product doors in the closed position.

Referring to the drawings for the purpose of describing the preferred embodiment and not for limiting same, FIG. 2 shows a swine confinement facility 10 having a conventional flushing system for directing water from a flushing tank 12 through the facility to remove waste accumulations therefrom for deposit in a holding tank 14. The wastewater in the holding tank 14 comprises liquid and solids in partial suspension. In the holding tank 14, the solids accumulate gradually at the base thereof, with fine particulate solids remaining in suspension.

A conveyor system 20, as described below, transports the solids to a product dryer 22. Liquids removed from the solids on the conveyor system 20 are returned by to the holding tank 14. In the dryer, 22, the solids are dried and discharged as recycled product 24. The interior of the dryer 22 is heated to a controlled temperature by heating system 26, which also heats wastewater from the holding tank 14 as described below. The dryer 22 heats the air in the interior to dry the solids material and is vented by line 28 to an ammonia separator 30. The gaseous products, including recovered ammonia, is passed through a condenser 32, liquefied and routed to a storage tank 34. Water fed to the separator from the dryer along line 147 is returned by line 36 to the holding tank 14.

Figure 5:
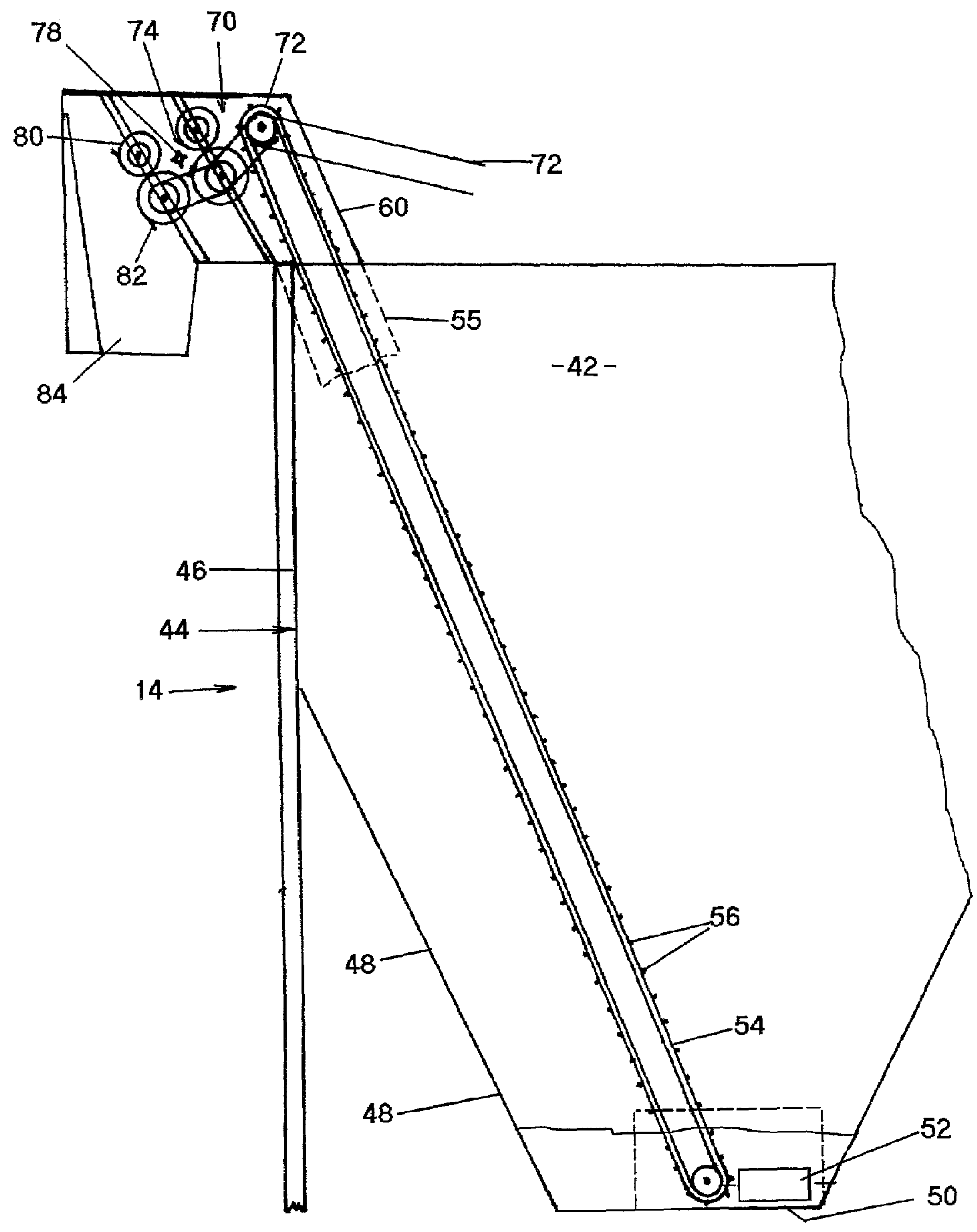
FIG. 5 is a fragmentary view showing the conveyor and processing head for removing solids material from the holding tank.
Figure 7:
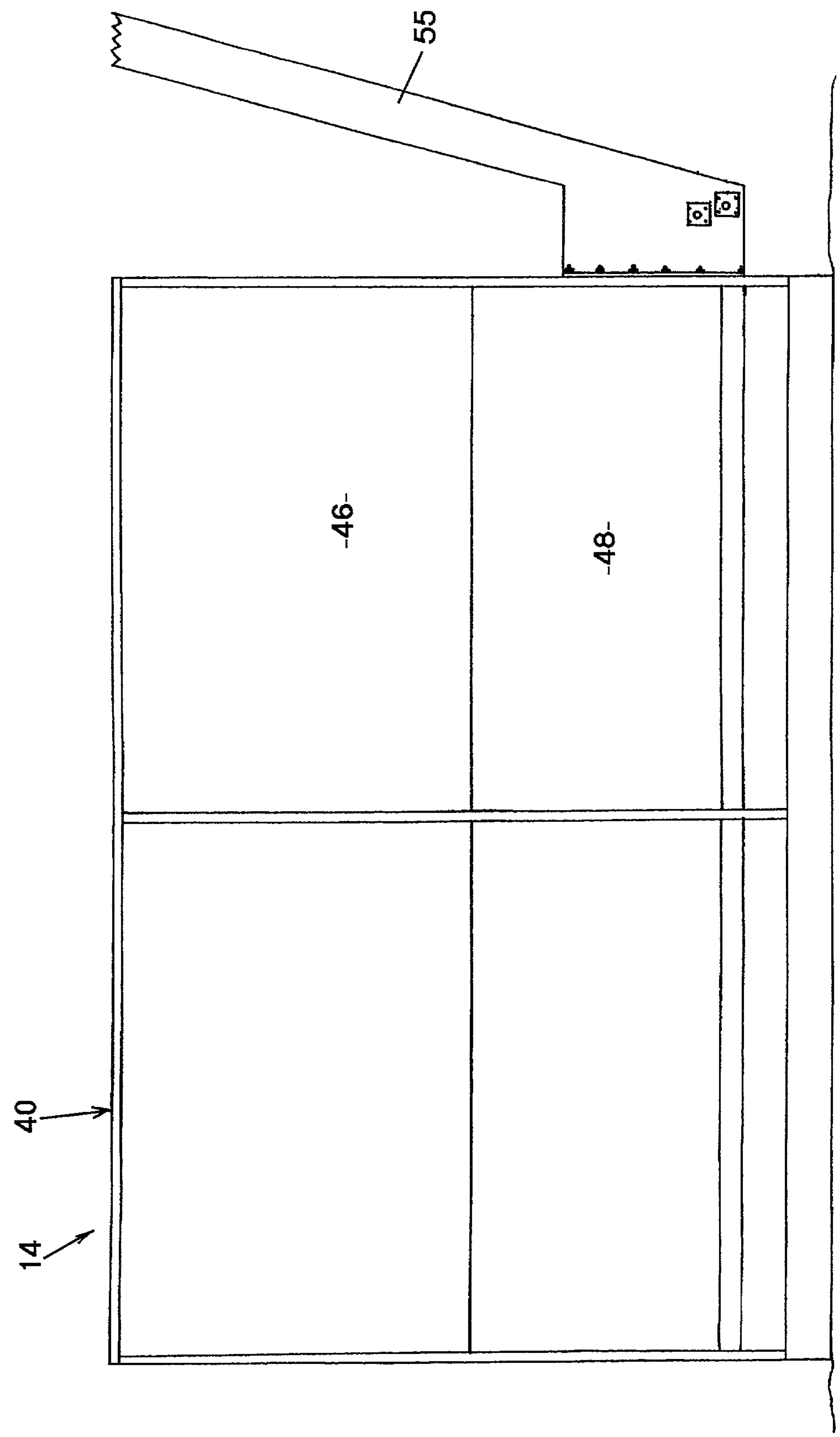
FIG. 7 is a side elevational view of the holding tank and the conveyor system.

Referring to FIGS. 5 and 7, the holding tank 14 comprises a covered enclosure 40 having spaced vertical end walls 42 and spaced side walls 44 having a vertical upper section 46 and an inwardly inclined lower section 48 establishing a narrow rectangular base 50 on which the solids material 51 settle and accumulate.

The conveyor system 20 includes a horizontal conveyor 52 positioned longitudinally along the base 50 of the holding tank 14 that routes solids material to an inclined vertical conveyor 54 attached exteriorally to a side wall 42 of the holding tank 14, and extending through and enclosed by housing 55. The conveyor 54 extends vertically and outwardly from the holding tank. The conveyors 52 and 54 each have a perforated or porous belt for removing and carrying the settled solids from the bottom of holding tank 14. The porosity of the belts permit the drainage of liquid from the solids without particulate transfer therethrough. The conveyor belts may be provided with transverse flights 56 to assist in the transport of material. The conveyors operate at a low belt speed of ½ *ft/min*. to 1½ ft/min variable. The slow belt speed prevents agitating the solids in the wastewater as solids settle on the belt, thereby minimizing the generation of fine particulate suspension, which is difficult to settle in normal holding tanks. Further, the fine particulates are effectively filtered by the solids during travel on the conveyors, additionally reducing fine particulate buildup.

The bottom side sections 48 of the holding tank 14 are sloped at least about 60° to ensure that solid matter does not adhere to the sidewalls, thereby overcoming any problems attendant to solids build up. The vertical conveyor 54 is also inclined at a similar angle of about 60°. As the conveyor belt of conveyor 54 rises out of the holding tank 14, the water content is drained from the solids through the conveyor belt perforations, and directed back to the holding tank 14 by the walls of a chute 60 enclosing the conveyor 54. A compactor assembly 62 is located at the upper end of the chute 60. The solids carried on the vertical conveyor 54 are discharged to a roller system 70, operated by motor driven belt 72, for compacting the solids to thereby remove additional water content therefrom. The solids are initially fed from the conveyor 54 to entry rollers 74. The initially compacted solids are removed from the lower roller by scrapers 76 and fed through a rotating separator flail 78 to secondary rollers 80. The further compacted and drained solids are discharged and removed from the secondary rollers 80 by scrapers 82 for gravity discharge through discharge outlet 84 and through discharge chute 86 into a feed tank for dryer and then moved by conventional conveyor into intake hopper 88 of a product dryer 22. A secondary rotating flail 8,9 driven by belt 91 and motor 120, is operatively positioned in the discharge chute 86 and serves to pulverize any clumps in the solids resulting from the rolling operations.

Figure 1:
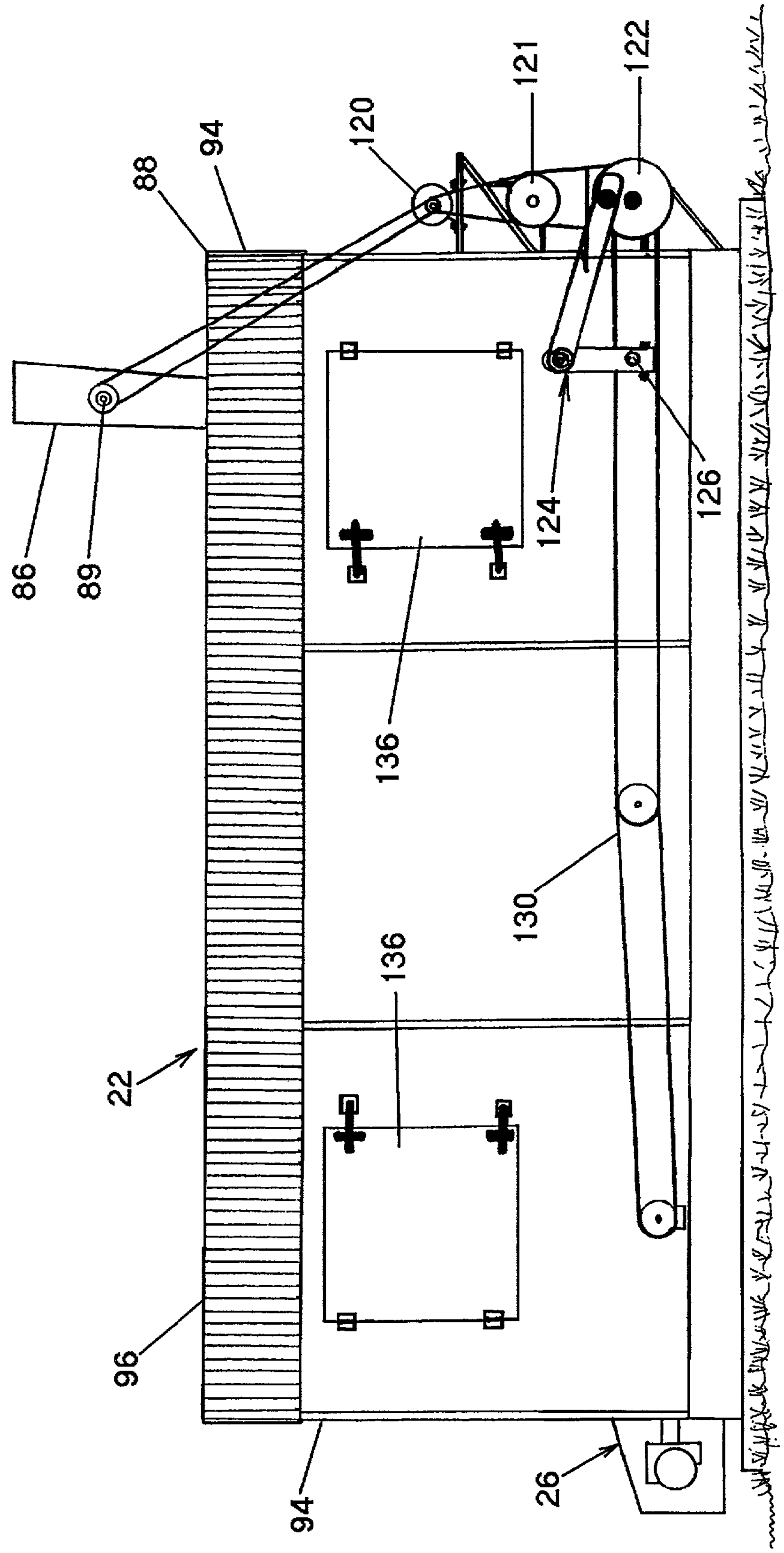
FIG. 1 is a side elevational view of a processing system in accordance with a preferred embodiment of the invention.
Figure 4:
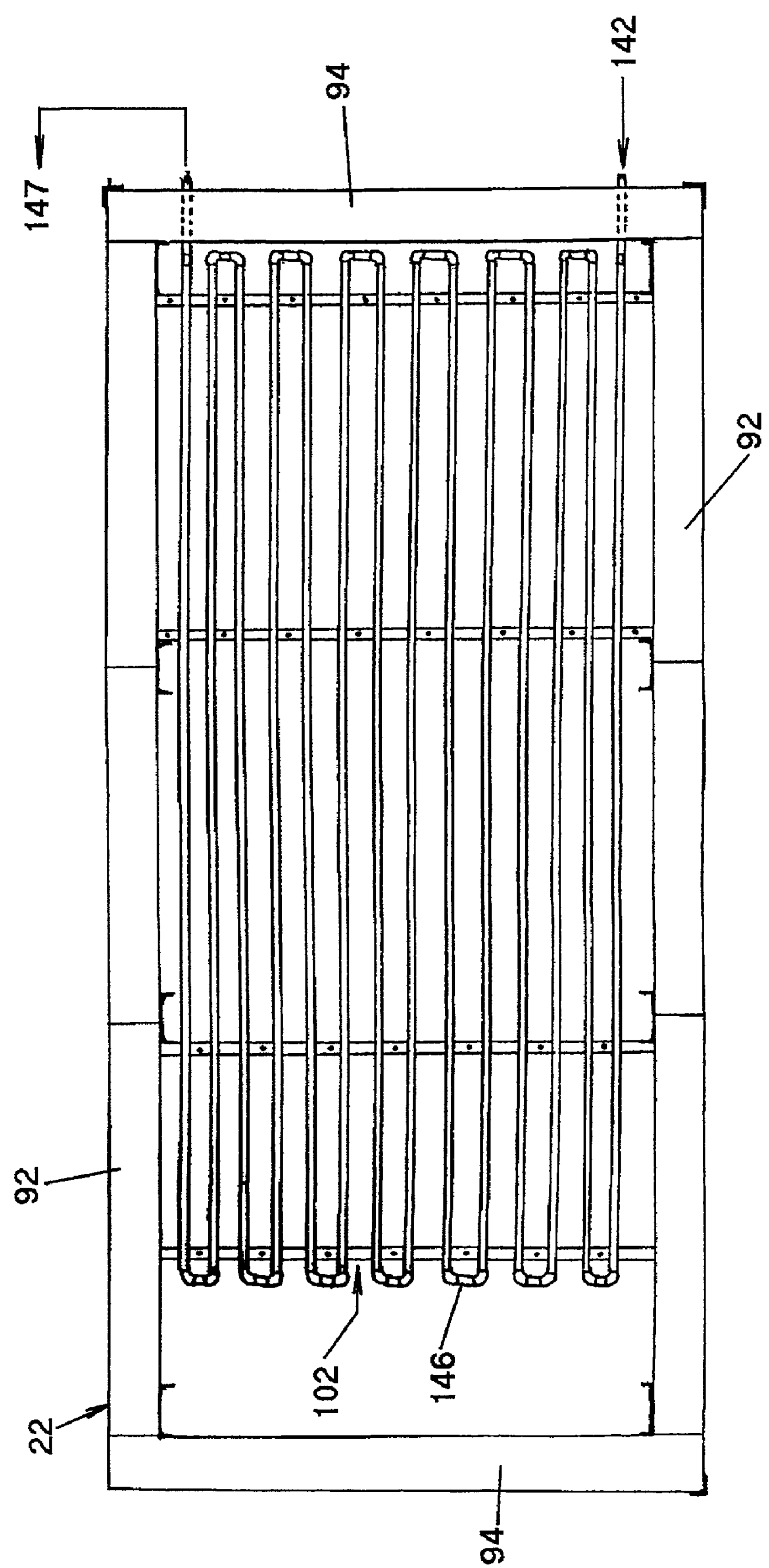
FIG. 4 is a horizontal sectional view showing the lower water heating tubes for the dryer mounted upon the top of the lower heat exchanger.
Figure 6:
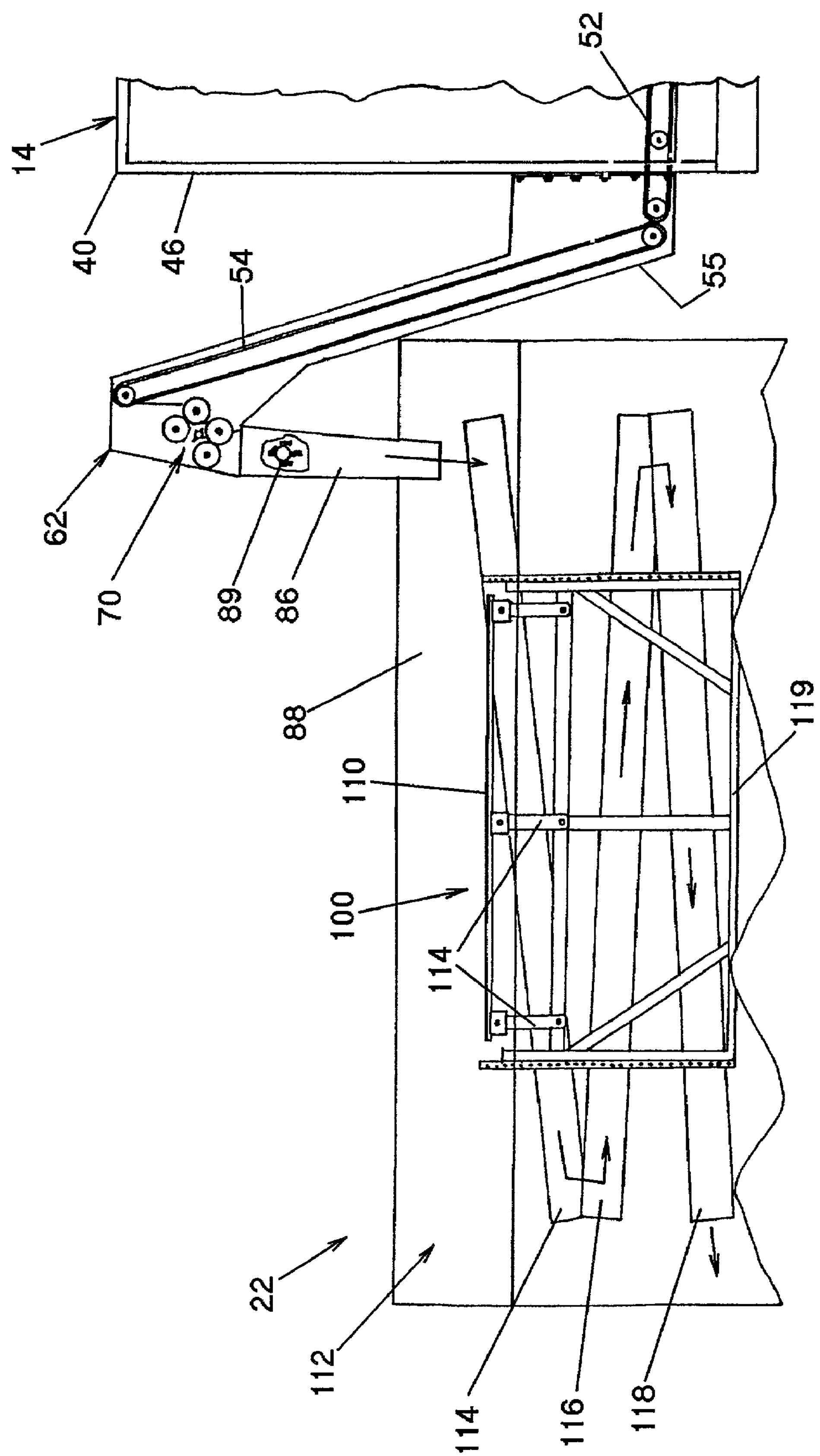
FIG. 6 is a side elevational view of the conveyor system for routing solids material from the holding tank to the shaker tray assembly of the dryer.
Figure 8:
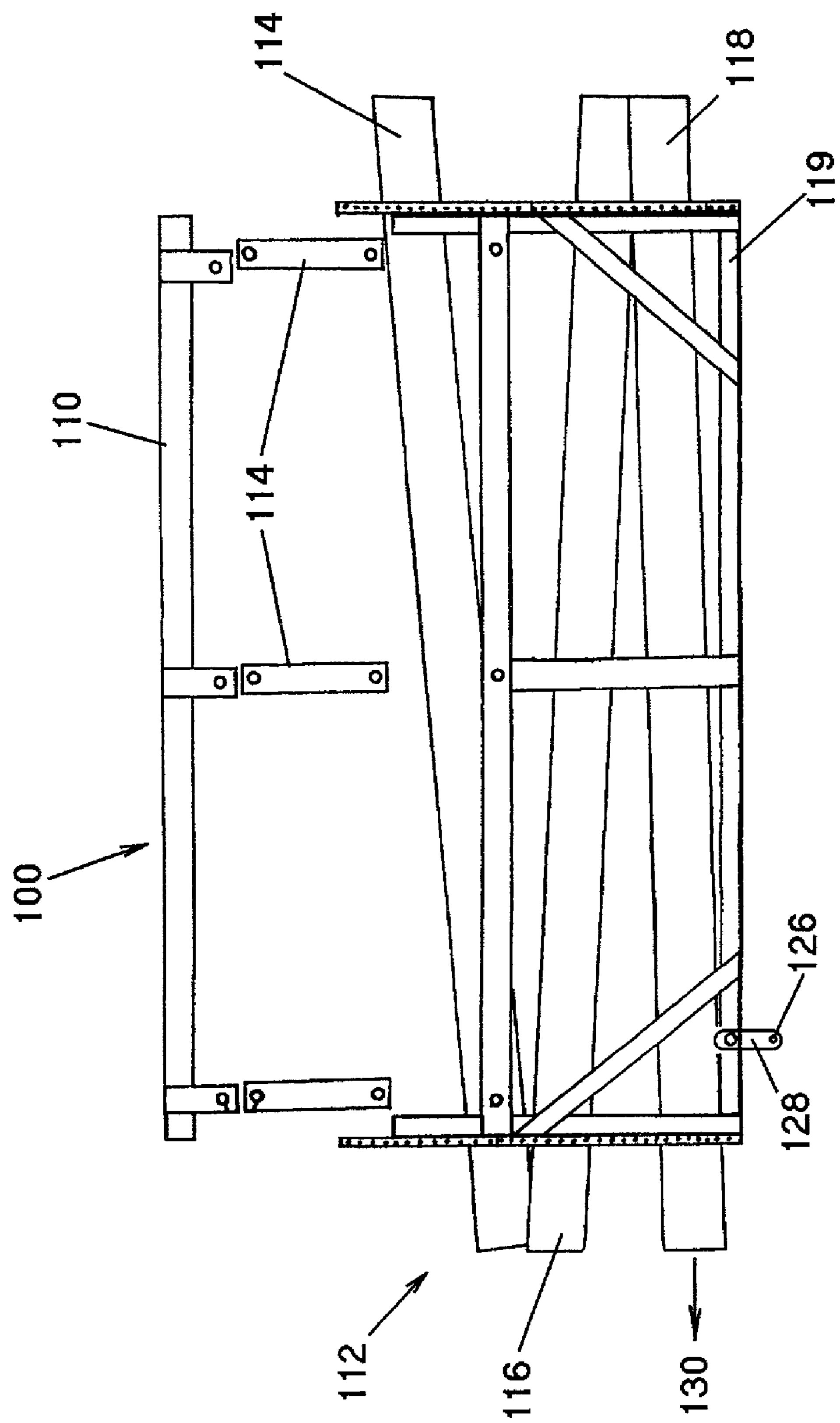
FIG. 8 is a side view of the shaker tray assembly.

The dryer 22 comprises an insulated housing 90 defined by rectangular sidewalls 92 and end wall 94, a top wall 96 and a base wall 98. The hopper 88 is located at an upper lateral end thereof. Referring to FIGS. 6 and 8, a dryer rack assembly 100 is carried in the interior of the housing 90 above a serpentine heating coil 146 (FIG. 4) carried in the base thereof. The dryer rack assembly 100 includes a frame 110 connected to the sides of the housing and connected to an oscillating shaker bed 112 by pivotal links 114. The shaker bed 112 includes a plurality of alternating, downwardly inclined reciprocating trays 114, 116, 118 carried by shaker frame 119. As shown in FIG. 1, an electric motor 120 and speed variator 122 drive crank wheel 122 to actuate linkage 124 and oscillate through shaft 126, which is connected to the lower end of lever arm 128. The lever arm 128 is pivotally connected at an upper end to the shaker frame 119. Accordingly, in operation, the shaker frame 119 is reciprocated about pivotal links 114. The solids, under reciprocation of the trays, progressively move, as shown by the arrows, down the slope of the top tray 114 and are deposited upon the upper end of the second tray 116. The process is repeated through lower tray 118 at which location the solids are substantially dried with the remaining dried product no longer possessing fecal properties and becoming an organic material suitable for fertilizer or animal feed base. The dried, sterilized product can then be moved from the dryer through discharge auger for use or storage by conventional handling equipment.

The heating system 26 includes a heat source 140 including a heat exchanger that routes waste water along inlet line 142 from holding tank 14. A low volume pump 144 in line 142 fluidly connects the inlet of the serpentine heating pipe array 146 in the base of the dryer 22 and the holding tank 14 along return line 142. A branch line 147 is routed to the separator 30 as described below. The heating system heats the conveyed wastewater to elevated temperatures sufficient to kill any germs, bacteria, worm eggs, larva or other pathogens. The three heat exchangers 102 serve to heat the interior of the dryer to elevated temperatures sufficient for drying the solids at temperatures necessary to dry and sterilize the product in the shaker trays. The resultant steam is vented to the separator 30 along exhaust line 28.

Figure 9:
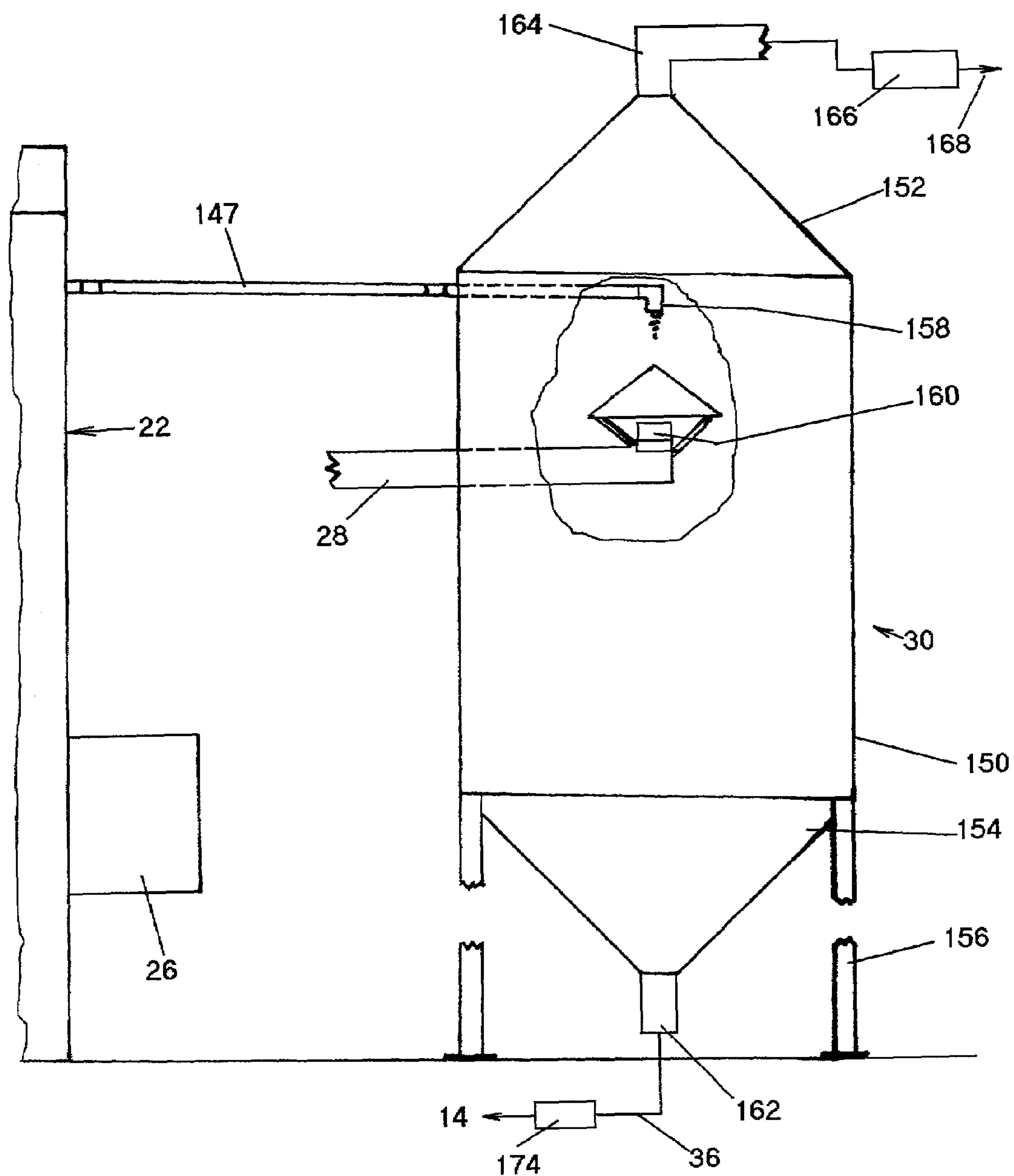
FIG. 9 is a side cross sectional view of the ammonia separator for the processing system.

As shown in FIG. 9, the line 147 is routed through a rear wall of the dryer and directed to the ammonia separator 30. The separator 30 includes a cylindrical center housing 150, an upper frustoconical dome 152 and a lower frustoconical base 154. The separator 30 is positioned adjacent the dryer and supported on legs 156. The line 147 enters at the top of the housing 150 and terminates with a downwardly directed 360° scrubbing nozzle 158 positioned at the housing axis. The exhaust line 28 is connected at one end to the dryer and routes process steam therefrom into the center of the separator housing 150 through an upwardly directed outlet 160 positioned below the nozzle 158. A downwardly opening conical diffuser 160 is carried on the steam outlet 160 intermediate the outlet and the nozzle 158 and serves to radially distribute the wastewater and steam for extraction of ammonia constituents from the admixture. Condensed wastewater, stripped essentially of ammonia constituents, is routed through drainpipe 162 in the base 154 for return to the holding tank 14 along the return line 36. The process steam with the ammonia content is withdrawn from the dome 152 at outlet pipe 164, passed through condenser 32 and routed to a collection tank 34 for removal for ancillary purposes. This "gray ammonia" can be used by a solvents recovery company as raw material for pure ammonia and other products of commercial value.

The discharge water from the drain pipe is pumped through filter 174 to the holding tank 14 along line 36. From the holding tank 14, the processed waste water is passed through an optional secondary commercial sand filter 172 and back to the flush holding tank 12 ready for the next flushing cycle.

After a period of time, the continual recycling of the wastewater will result in a build-up of minerals that will require replacement with fresh water.

Accordingly, mineralized water may be transferred to a suitable auxiliary tank on the farm for future use such as direct application to farm crops using existing fertilizer distribution systems, thereby supplementing expensive commercial fertilizers.

The heat system for the dryer may be natural or LP gas, kerosene or fuel oil, or any fuel source providing a steady, reliable, safe, and usable temperature to allow the system to function correctly. Regardless of source, heated air from the heat source enters a lower heat exchanger and passes to a front heat exchanger. From the front heat exchanger the flow moves by pipe into the matching rear heat exchanger and from there it moves into the rear end of the top heat exchanger and is exhausted out of the other end.

It will be appreciated that the above-described closed-loop processing system eliminates the need for a holding lagoon and the problems and dangers associated therewith. Further, based on testing, the dried-sterilized product yields a feed value of about 65–75% of new feed; and a fertilizer value of 8-4-8, which is of commercial value and is organic. Moreover, the system is environmentally beneficial and cost effective, eliminating the costly expense of building and maintaining swine lagoons, as well as the need for expensive high volume pumps and pumping units, irrigation systems, and fuel. Furthermore, the use and/or sale of the resultant products not only defrays the cost for the system and its operation and maintenance, but actually provides a net profit for the farmer.

The system may also be adapted for processing poultry litter. A poultry system will not generally require a holding tank with the belt conveyor, beater and water system. Therein, the poultry litter removed from the poultry houses will be delivered to the dryer hopper, after being processed by a hammermill. The litter will be processed through the shaker trays for discharge in the manner described above. Misting nozzles may be located as needed to control the dust from the processing operations.

The system may also be used for processing cattle waste, either as a "dry" system like the poultry litter processor or a "wet" system like the swine waste processor. For a wet system, a conventional hammer mill may be substituted for the mechanical flail and the roller system at the dryer intake hopper. Such mechanical disruption will grind or pulverize any hay, straw, corn cobs or husks that may have been wasted by the cattle or have been used as bedding. The dryer and downstream subsystem would remain the same.

For the processing of human waste, a much higher temperature will be maintained in the dryer to incinerate the solids, thus leaving only a small amount of ash for disposal. The water from the system can be collected and disposed in the same manner as the conventional systems. The difference will be that the solids will have been removed and the water will have been boiled. These processors can be stationary or mobile.

The dryer can be stationary or mobile. If mobile, the fuel tank and a small gas or diesel generator will be located on the system. The combine operator would unload the combine grain tank into the hopper above the dryer. The crop may be metered to the trays to provide a feed rate that will ensure proper drying prior to discharge.

As a roaster for oilseed such soybean, peanut, sunflower, cottonseed, and the like, the temperature and dryer dwell time can be adjusted to produce the desired product. The roasted product would then be processed for oil and meal as is conventionally being done now.

Farmers lose a lot of money each year at harvest time. There are times when a crop such as corn, soybeans, or grain could be harvested but deferred because excessive product moisture seriously lowers the selling price. Conventionally, the farmer waits for nature to dry the crop. Often, however, nature does not cooperate. Instead of sunny days there can be an extended period of rain or snow, even a flood, and the farmer could lose everything. The present drying system enables the farmer to harvest and dry crops ahead of inclement weather thereby avoiding moisture dockage costs.

A system for human and veterinary hospitals would include the basic processor components, with or without pulverizing, depending upon the nature of the waste being processed. An incinerating unit would maintain a temperature required to destroy hospital waste. The units will not require the pipe array that is necessary in a "wet" system such as a swine processor. Resulting ash from these systems can be disposed of by conventional methods such as in a landfill.

The old style type of flue cured tobacco curing and drying barns are a thing of the past, and have been replaced by "bulk" barns. The bulk barn is much simpler, faster, and easier to fill and empty than the older "stick" barn. These newer barns will hold around three times as much tobacco as the obsolete barns they replaced.

Even though the new barn is vastly superior to the old, they share a common problem. When the tobacco curing/drying process is completed, the tobacco leaves crumble into pieces if some form of moisture is not introduced to soften the leaves. This is necessary to enable the tobacco leaves to be removed and sheeted or baled for sale. With the old stick barn, this was accomplished by opening the doors and vents and letting the night air soften the leaves. If this was not sufficient to do the job due to dry night air, coolness, or wind, the farmer would be forced to haul water and pour it onto the floor of the barn.

The bulk barn cannot be handled this way because of its construction and the tobacco being packed in such a manner as to not allow the circulation of air through the leaves. The bulk barn is humidified by connecting a water hose to a water supply. The barn has a controlled system for distributing the water and moistening the tobacco. The primary problem with this system is that it can take from 24 to 36 hours for this process to be completed. This is time that can be critical for a farmer especially during times of heavy harvest or approaching tropical storms, hurricanes, or frost.

The present drying system will reduce this time consuming process to only a few hours, perhaps to no more than is usually required to ready the leaves for market, usually around 3 hours.

Figure 10:
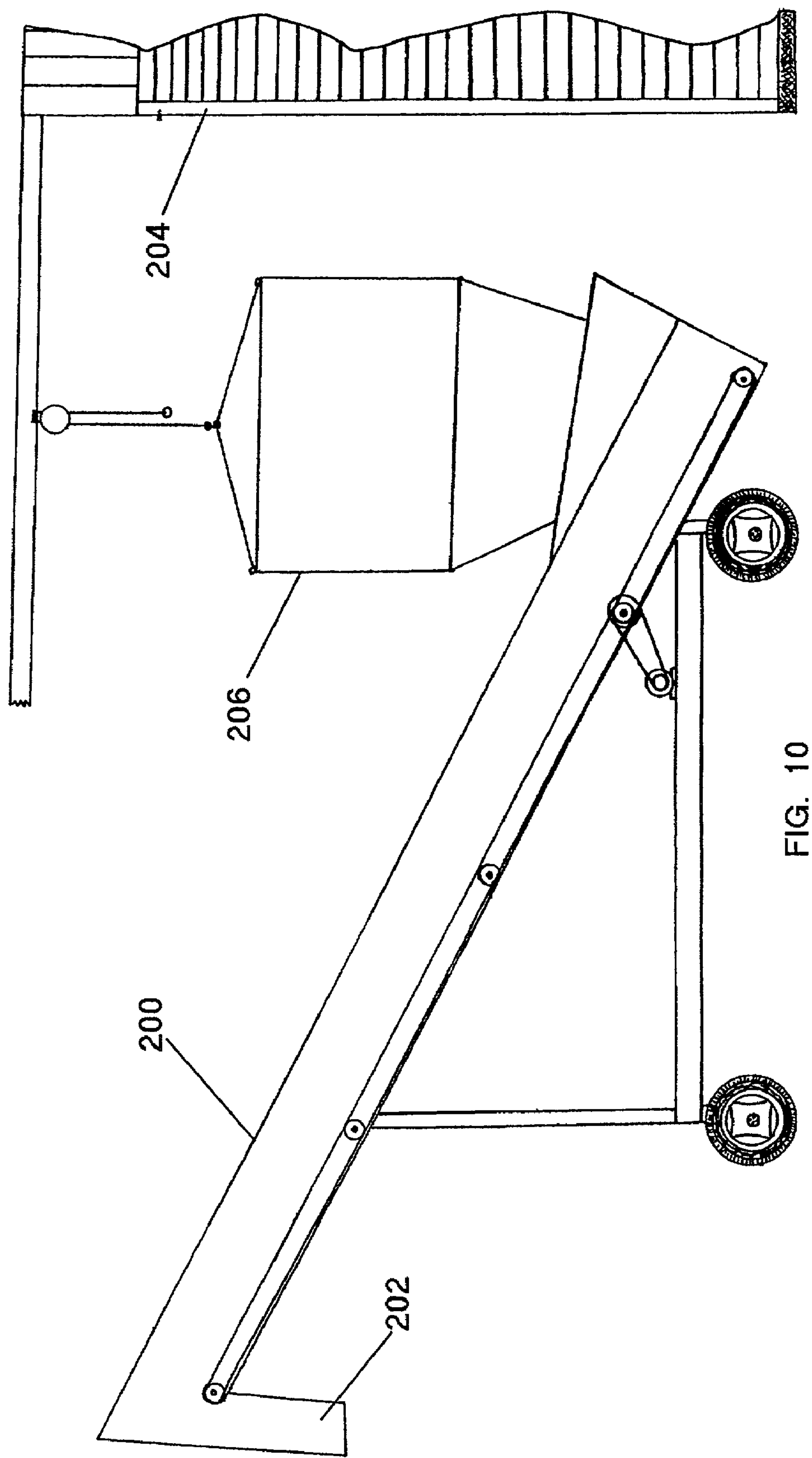
FIG. 10 is a side view of the loading conveyor for transferring tobacco leaves to the dryer.
Figure 11:
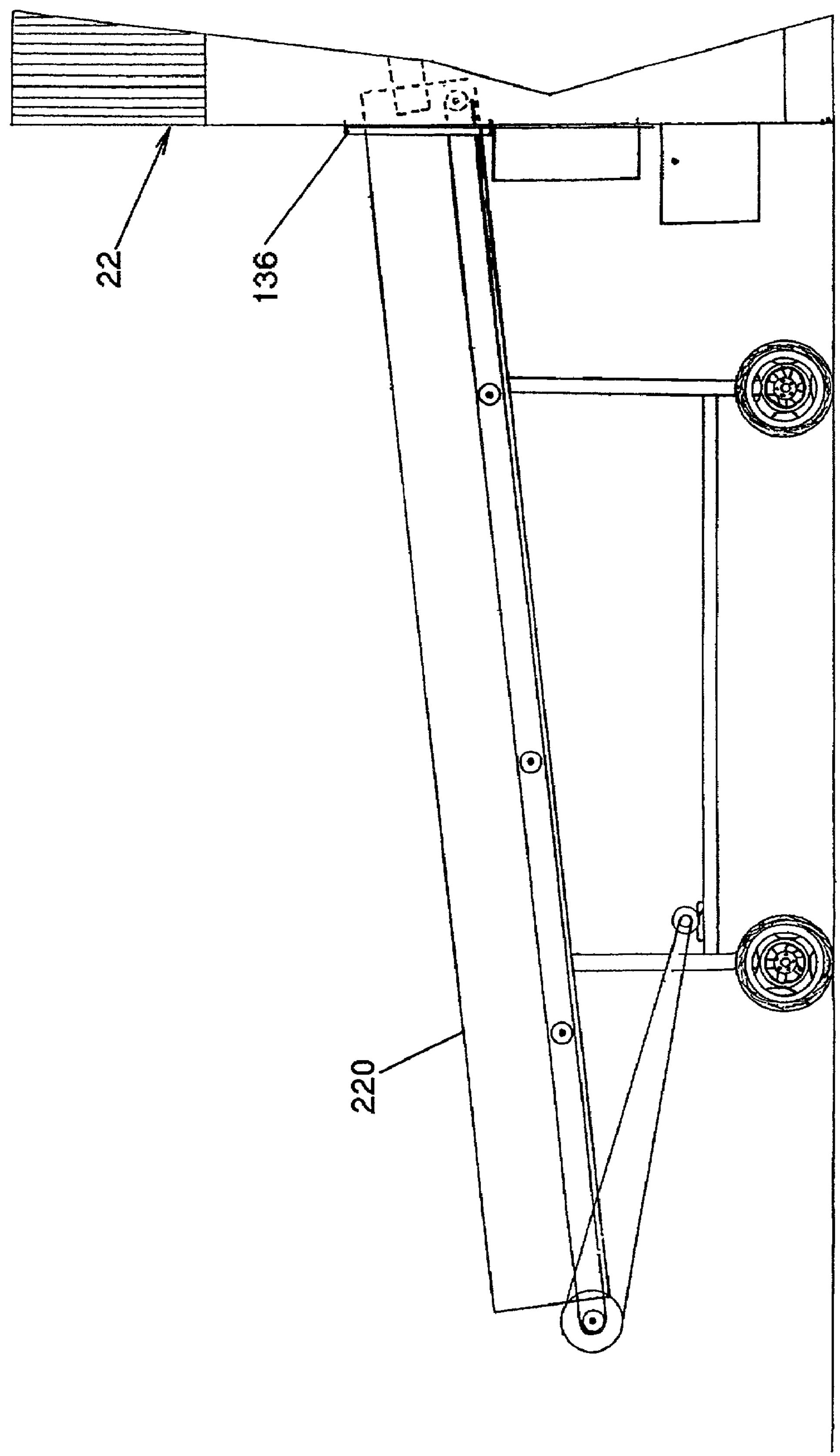
FIG. 11 is a side view of the loading conveyor for transferring crops to the dryer.

A flue cured tobacco humidifying system uses the above described dryer. As shown in FIG. 10, instead of the agitator or beater within the feed hopper arrangement located above the dryer inlet as used in the swine unit, the tobacco moves by a very slow moving covered conveyor 200 of conventional design for delivery through discharge chute 202 directly into the top of the dryer as delivered from the bulk barn 204 by hopper 206. Instead of utilizing several shaker tray levels, the dryer unit requires only the top most level. Above the standard top level tray, a perforated sheet or screen is provided that allows more air circulation around and through the leaves than if they were only allowed to move along the floor of the upper level rack. Any sand or fine foreign matter will be removed by the action of the tobacco across the perforated top or screen. This sand and fine foreign matter will continue on through the levels of the oven and be discharged via the standard dryer discharge auger. With the dryer outfitted for tobacco, the leaves will leave the dryer by conveyor through the door located on the upper rear of the dryer. This "shelf-type item" conveyor will move the now moistened and softened tobacco to the sheeting or baling area.

Moisture is supplied within the dryer by fresh water being sprayed or dripped, by control, upon the top of the bottom heat exchanger located within the dryer. Upon completion of the tobacco process, the "tobacco mode" components can be removed in minutes and the dryer returned to processing fecal waste or drying grain etc. In other words, the farmer can use the basic drying system on several crops by the use of the various quick change components designed for the dryer and different crops.

For food crops, the standard dryer is constructed of FDA required construction materials. The only other basic change is that the product is discharged upon a stainless mesh belt conveyor arrangement for exit from the dryer instead of the usual discharge auger. Such product may be loaded into the dryer, as shown in FIG. 10, by a conveyor 200 accessing the dryer interior via intake hopper 86 without beater 89.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed is:

1. A processing system for treating waste products discharged in a waste water from an animal containment operation, comprising:

reservoir means for receiving the waste water and permitting solids to accumulate at the bottom thereof;

conveyor means for transferring solids from said bottom at a rate preventing agitation of the waste water, said conveyor means including a belt carrying said solids of a porosity permitting drainage of water content therein without allowing passage of solid material therethrough; compaction means for receiving said solids from said conveyor means and for compressing said solids for removing additional water content therefrom;

pulverizing means for receiving said solids from said compaction means and reducing the solids to particulates;

a product dryer having an interior compartment for receiving said solids from said pulverizing means;

heating means associated with said product dryer for heating said solids to an elevated temperature sufficient to substantially remove the remaining water content therein, reduce bacterial and pathogenic content therefrom, and evolve an exiting vapor content; and circulation means fluidly connected between said heating means and said reservoir means for heating said waste water to an elevated temperature.

2. The processing system as recited in claim 1 wherein said heating means includes heating coils in said interior compartment connected with said circulation means for effecting said elevated temperature to heat said solids.

3. The processing system as recited in claim 2 wherein said circulation means is fluidly connected from said heating coils to an ammonia separator for spray delivery of heated waste water therein, said separator including a drain line for returning said waste water to said reservoir means.

4. The processing system as recited in claim 3 including conduit means for routing said gaseous products from said product dryer to said separator.

5. The processing system as recited in claim 4 including vent means for exhausting gaseous products from said separator, and condensing means for liquefying said gaseous products.

6. The processing system as recited in claim 2 wherein said product dryer includes a reciprocating dryer bed for receiving said product from said pulverizing means at an entrance location and for transferring and agitating said solids for discharge and an exit location to a product holding area in said product dryer.

7. The processing system as recited in claim 6 wherein said dryer bed includes a vertical series of reversely inclined bed effecting to transfer said product from said entrance location to said exit location.

8. The processing system as recited in claim 1 including filter means in said circulation means for filtering said waste water prior to return to said reservoir means.

9. The processing system as recited in claim 1 wherein said waste water from said animal containment operation is obtained from a flushing reservoir, wherein said flushing reservoir is fluidly connected with said reservoir means.

* * * * *